UNITED STATES PATENT OFFICE.

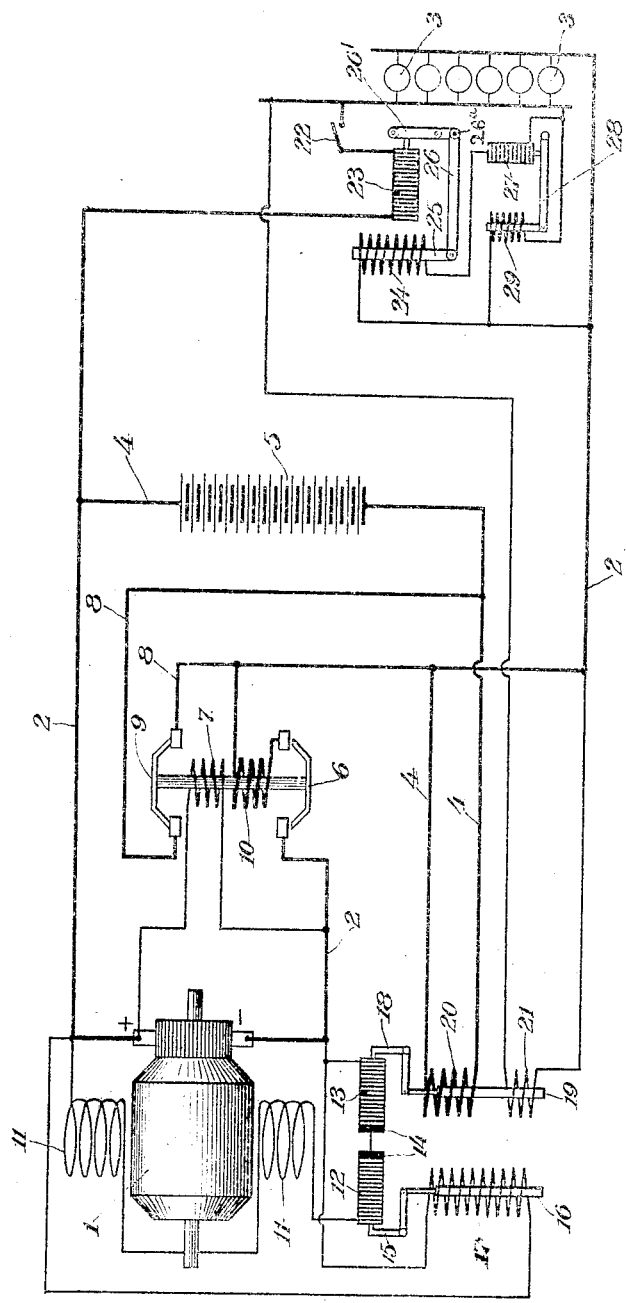

JOHN W. JEPSON, OF DEPEW, NEW YORK, ASSIGNOR TO GOULD STORAGE BATTERY COMPANY, A CORPORATION OF NEW YORK.

ELECTRICAL SYSTEM OF DISTRIBUTION.

1,204,160.

Specification of Letters Patent.   Patented Nov. 7, 1916.

Application filed January 25, 1910.   Serial No. 539,917.

*To all whom it may concern:*

Be it known that I, JOHN W. JEPSON, a citizen of the United States, and a resident of Depew, county of Erie, and State of New York, have invented certain new and useful Improvements in Electrical Systems of Distribution, of which the following is a specification.

My invention relates to improvements in electrical systems of distribution and more especially to systems in which a storage apparatus and work circuit are supplied by a main generator and automatic means are provided for regulating the action of the generator in accordance with the needs of the system.

One object of my invention is to provide such a system in which the generator regulating means is regulated in accordance with the load on the work circuit to vary the battery charging current in order not to overload the generator, and still permit a generator of relatively small size to be used.

I do not claim broadly herein the novel arrangement for cutting down the battery charging current when the battery has become charged, nor the novel mechanical features of the generator regulator, these being described and broadly claimed in my Patent No. 1,179,373, dated April 11, 1916, and my copending application Serial No. 601589, filed January 9, 1911.

Further objects, features and advantages will more clearly appear from the detailed description given below taken in connection with the accompanying drawing which forms a part of this specification.

The drawing is a diagram of a system embodying one form of my invention as applied to a car lighting system in which the main generator is driven at a variable speed by the movement of the car.

Referring to the drawing, 1 represents a main generator supplying the mains 2, 2, which supply the work circuit or lamps 3. Connected across the mains 2, 2 in a circuit 4 is a storage battery 5. In the negative main 2 is a switch 6 arranged to close the main circuit when the voltage of the generator has reached its proper value. For this purpose the switch 6 is arranged to be raised by an electromagnet coil 7 connected across the terminals of the generator 1. When the generator reaches this predetermined voltage the switch 6 closes the circuit through the negative main 2 and at the same time opens the circuit through conductors 8 by opening switch 9. A coil 10 in the negative main 2 is also arranged to act to increase the effect of the coil 7 when the generator is furnishing current but acts to open the switch 6 upon the voltage of the generator decreasing below that of the battery, in a well known manner.

The generator 1 is provided with shunt fields 11 connected across its terminals. In series with the fields 11 is a carbon pile rheostatic apparatus consisting of two sets of carbon blocks or variable resistances 12 and 13. Each of these variable resistances is provided with a fixed member 14 at its inner end although these fixed members are not essential to the broad aspects of my invention. The members 14 may be made movable, forming one long pile and still certain advantages of the present invention attained. The resistance of the blocks 12 is varied by means of a bell crank lever 15 connected to the core 16 of the electromagnet or solenoid 17. The windings of the electromagnet or solenoid 17 are connected in shunt across the terminals of the generator so as to be responsive to variations in voltage changes of the generator and battery. The part 13 is varied by a bell crank lever 18 pivotally connected to a core 19. The movement of the core 19 is controlled by electromagnet windings 20 and 21, thus forming a suitable solenoid for the regulation of the resistance 13. The windings 20 are serially connected between the generator and battery by being connected in series with the battery in the circuit 4, so that they will regulate the current output of the generator, while the windings 21 are connected in shunt across the work circuit or lamps 3, 3. A switch 22 is provided in the positive main 2 for connecting the battery and generator to the work circuit.

Adjacent the switch 22 and between the battery 5 and the work circuit I provide a carbon pile resistance 23 in series in the positive main 2. The carbon pile resistance 23 is controlled by a coil 24 operating upon the core 25 which actuates a bell crank lever 26 pivoted at 26ª. The short arm of the lever 26 is pivoted to the lever 26' so that when the core 25 is moved upwardly the lever 26 moves the lever 26' todecrease the pressure on the carbon pile 23. The windings 24 are connected across the work circuit or lamps 3, 3 and in series therewith there is provided a second carbon pile 27 operated by a lever 28 controlled by a coil 29 also connected across the work circuit or lamps 3, 3. The coil 24 controls the carbon pile 23 so as to keep the voltage at the translating devices substantially constant, and this action is magnified by the variations in the carbon pile resistance 27 which is controlled by coil 29.

In operation the battery is arranged to feed the work circuit 3, 3 when the generator is not running or when its voltage is too low for practicable operation thereunder. Under these conditions the switch 9 closes the circuit 8, 8, thereby connecting the battery directly to the lamps 3, 3, although the carbon pile resistance 23 is included in circuit in order that the voltage at the lamps may be maintained substantially constant irrespective of changes in the battery voltage.

If now the speed of the main generator be increased so that it will produce a voltage sufficient to feed the lamps the coil 7 closes the switch 6 and opens the switch 9. This connects the generator with the battery and work circuit and also throws the coil 20 in series with the battery. When the voltage of the generator rises sufficiently to produce the proper charging current for the battery this charging current may be limited or maintained substantially constant by means of the coil 20. That is, when such a charging current is produced the strength of coil 20 is such that it acts upon the core 19 and, without raising the core, nevertheless puts it in a condition of equilibrium. If the voltage of the generator tends to increase, thereby tending to increase the charging current, the coil 20 will raise the core 19, thereby increasing the resistance of the pile 13 and decreasing the generator field strength so that its voltage will be accordingly decreased sufficiently to maintain the charging current substantially constant. If a decrease in generator voltage occurs a reverse action takes place and the coil 20 allows the core 19 to drop, thereby decreasing the resistance of the carbon pile 13 and increasing the voltage of the dynamo 1, so that the charging current may be brought back substantially to the same value. In describing the operation thus far we have assumed that the switch 22 was open, thus disconnecting the work circuit, so that the coil 21 was deënergized.

The operation thus described continues until the battery becomes properly charged. When it has become sufficiently charged, indicated by its rise in voltage to a predetermined point, and the corresponding rise of the generator voltage, the electromagnet 17 becomes sufficiently energized to place its core 16 in equilibrium. When the battery voltage rises any higher the core 16 is raised, thereby increasing the resistance of the carbon pile 12 and decreasing the generator voltage. This cuts down the charging current as will be clearly understood. Thus the solenoid 16, 17 is not brought into action until the battery has become charged to the desired extent and it then acts to prevent further increase in generator voltage and to decrease the battery charging current. It, therefore, usurps the functions of the variable resistance 13 and the core 19 readily drops back to its initial position due to the decrease in the charging current. That is, when the battery is receiving its substantially constant charging current the voltage coil 17 and core 16 remain substantially inoperative, and when the voltage coil 17 becomes operative upon the rheostat the current coil 20 and core 19 become substantially inoperative. It is also noted that the electro-magnets operating upon the rheostats 12, 13 operate mechanically independent of one another.

It is desirable when the work circuit is being fed by the generator that the charging current to the battery be somewhat decreased although maintained substantially constant after such decrease, in order that the generator may not be overloaded. For this purpose the coil 21 acts to aid the coil 20 and accordingly adjust its action dependent upon the load being thrown on at the work circuit by usurping part of its functions when the switch 22 is closed. That is, upon the closing of the switch 22 the coil 21 becomes energized and produces a constant attractive force upon the core 19. This allows the generator voltage to be kept down with a much smaller charging current so that the total current supplied by the generator may not be excessive. That is, when the work circuit is disconnected and the generator running at a proper speed, it will furnish a substantially constant charging current to the battery, which current is kept substantially constant by the coil 20. If, now, the work circuit be connected and fed by the generator, the generator might be overloaded by the additional work circuit load thereon. But in my improved system, upon this connecting up of the work circuit, the coil 21 is energized so that a less current in coil 20 is required to reduce the pressure on the pile 13 and govern the generator voltage. Consequently, the charging current to the battery is decreased so that the generator is not overloaded when the work circuit is fed by the generator.

Although preferable, it is not necessary to the broad aspect of my improvements that the coils 17, 20 and 21 act directly upon the rheostats 12 and 13, since their functions may obviously be accomplished indirectly by other suitable means. Thus, although I have described my improvements in great detail nevertheless I do not desire to be limited thereto except as specified hereinafter in the claims, since many changes and modifications may be made without departing from the spirit and scope of my invention.

Having fully and clearly described my improvements what I claim as new and desire to secure by Letters Patent, is:

1. In an electrical system of distribution, a main generator, a work circuit and storage battery arranged to be supplied thereby, regulating apparatus for regulating the voltage of the generator, a coil for controlling said regulating apparatus, said coil being serially connected between the generator and battery, and a coil arranged to be brought into action upon the connecting up of the work circuit to the generator to aid said first mentioned coil.

2. In an electrical system of distribution, a main generator, a work circuit and storage battery arranged to be supplied thereby, regulating apparatus for regulating the voltage of the generator, a coil for controlling said apparatus responsive to current changes, and a coil arranged to be brought into action upon the connecting up of the work circuit to the generator, to aid said first mentioned coil and prevent the generator from becoming overloaded.

3. In an electrical system of distribution, a main generator, a work circuit and storage battery arranged to be supplied thereby, rheostatic apparatus for regulating the voltage of the generator, a coil responsive to battery current variations for regulating said apparatus to maintain a substantially constant charging current, and a coil arranged to be brought into operation to aid said first mentioned coil upon the connecting up of the work circuit to the generator, to cut down the charging current and prevent the generator from becoming overloaded.

4. In an electrical system of distribution, the combination of a main generator, a work circuit and battery connected to be supplied thereby, rheostatic apparatus for regulating the field of the generator to regulate its voltage, a coil serially connected between the generator and battery for regulating said apparatus, and a coil arranged to be brought into operation to aid said current coil upon the connecting up of the work circuit to the generator and battery, said second mentioned coil being connected across the work circuit.

5. In an electrical system of distribution, the combination of a main generator, a work circuit and battery connected to be supplied thereby, rheostatic apparatus in the field of the main generator for regulating the voltage thereof, two electro-magnets for independently regulating said apparatus, one of said electro-magnets operating responsive to changes in battery current to maintain a substantially constant charging current, and the other of said electro-magnets being connected responsive to voltage changes of the generator and arranged to be brought into operation to regulate the voltage of the generator when the battery has reached a predetermined condition of charge, and a coil arranged to be brought into action to aid said current electro-magnet to decrease the battery charging current upon the connecting up of the work circuit with the battery and generator.

6. In an electrical system of distribution, the combination of a main generator, a work circuit and battery connected to be supplied thereby, carbon pile rheostatic apparatus in series with the field of the generator for regulating the voltage thereof, two solenoids with their cores mechanically independently acting upon said apparatus, the cores being arranged to normally compress the blocks of said apparatus by their weight, one of said solenoids being responsive to current changes of the battery and the other of said solenoids being responsive to voltage changes of the battery and arranged to be brought into operation when the battery has become sufficiently charged to cut down the charging current thereof, said current solenoid being substantially inoperative when the voltage solenoid is operating, and a coil arranged to be brought into action to aid said current solenoid to decrease the battery charging current upon the connecting up of the work circuit with the battery and generator, said last mentioned coil being connected across the work circuit.

7. In an electrical system of distribution, a main generator, a work circuit and storage battery arranged to be supplied thereby, rheostatic apparatus for regulating the voltage of the generator, a coil serially connected between the generator and battery for regulating said apparatus and a coil arranged to be brought into operation to aid said first mentioned coil upon the connecting up of the work circuit to the generator to cut down the charging current and prevent the generator from becoming overloaded.

8. In an electrical system of distribution, a source of electromotive force, a work circuit and storage battery, arranged to be supplied thereby, means for regulating the voltage of the source to maintain a substantially constant charging current, and means for causing the source to furnish a less but substantially constant charging current to the battery when the work circuit takes load.

9. In an electrical system of distribution, a source of electromotive force, a work circuit and storage battery arranged to be supplied thereby, means for regulating the voltage of the source to maintain a substantially constant charging current, and means for causing the source to furnish a less but substantially constant charging current responsive to certain load changes on the work circuit.

10. In an electrical system of distribution, a main generator, a work circuit and storage battery arranged to be supplied thereby, regulating apparatus for regulating the voltage of the generator, a coil for controlling said apparatus serially connected between the generator and the battery, and a coil responsible to certain load changes on the work circuit to aid said first mentioned coil and prevent the generator from becoming overloaded.

11. The combination with a generator a translation circuit and means for regulating the translation circuit, of means for regulating the generator responsive to voltage fluctuations, means for regulating the generator responsive to current fluctuations and means for affecting the current regulating means affected by the operation of the translation circuit.

12. The combination with a generator and a storage battery and work circuit fed thereby, of means for regulating the generator voltage, said means including a current coil and a voltage coil to limit the generator voltage and means for affecting the regulating means responsive to voltage fluctuations in the translation circuit.

13. The combination with a generator and a storage battery and work circuit fed thereby, of means for regulating the generator voltage, said means including a current coil to modify the current output of the generator, a voltage coil to limit the generator voltage and means for affecting the regulating means responsive to changes in the electrical condition of the translation circuit.

14. The combination of a generator, a storage battery and work circuit connected to be fed thereby and means for regulating the generator comprising a regulating current coil and a coil operatively connected with the work circuit for adjusting the action of said current coil depending on a change in energization of the work circuit.

15. The combination of a generator, a storage battery and work circuit connected to be fed thereby and means for regulating the generator comprising a regulating current coil and means adjusting the action of said current coil depending on the energization of the work circuit, said last mentioned means embracing a voltage coil connected across the work circuit.

16. The combination of a generator, a storage battery and work circuit connected to be fed thereby and means for regulating the generator comprising a regulating current coil and means adjusting the action of said current coil to cut down the battery charging current responsive to an increase in load on the work circuit.

17. The combination of a generator, a storage battery and work circuit connected to be fed thereby and means for regulating the generator, comprising a regulating current coil in the battery charging circuit, and means adjusting the action of said current coil to cut down the battery charging current responsive to an increase in load on the work circuit.

In testimony whereof, I have signed my name to this specification, in the presence of two subscribing witnesses.

JOHN W. JEPSON.

Witnesses:
PIERCE W. ENGLISH,
W. H. PATTENDEN.

---

Correction in Letters Patent No. 1,204,160.

It is hereby certified that the assignee in Letters Patent No. 1,204,160, granted November 7, 1916, upon the application of John W. Jepson, of Depew, New York, for an improvement in "Electrical Systems of Distribution," was erroneously described and specified as "Gould Storage Battery Company," whereas the said assignee should have been described and specified as *Gould Coupler Company*, as shown by the records of assignments in this office; and that the said Letters Patent should be read with this correction therein that the same may conform to the record of the case in the Patent Office.

Signed and sealed this 26th day of December, A. D., 1916.

[SEAL.]

R. F. WHITEHEAD,
*Acting Commissioner of Patents.*

Cl. 171—313.